US009349580B2

(12) United States Patent
Ferrara

(10) Patent No.: US 9,349,580 B2
(45) Date of Patent: May 24, 2016

(54) COUPLING DEVICES AND SOURCE ASSEMBLIES INCLUDING THEM

(75) Inventor: Keith Ferrara, Stratford, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 482 days.

(21) Appl. No.: 12/900,574

(22) Filed: Oct. 8, 2010

(65) Prior Publication Data
US 2011/0085852 A1 Apr. 14, 2011

Related U.S. Application Data

(60) Provisional application No. 61/249,779, filed on Oct. 8, 2009.

(51) Int. Cl.
H01J 49/10 (2006.01)
F16B 7/20 (2006.01)

(52) U.S. Cl.
CPC . H01J 49/10 (2013.01); F16B 7/20 (2013.01); Y10T 403/7009 (2015.01)

(58) Field of Classification Search
CPC ............ F16B 7/20; F16B 21/02; F16B 21/04; Y10T 403/7005; Y10T 403/7007; Y10T 403/7015; Y10T 403/599
USPC ................. 403/348, 349, 350, 353, 354, 375; 250/288
See application file for complete search history.

(56) References Cited

U.S. PATENT DOCUMENTS 3,854,832 A * 12/1974 Cowper ........................ 403/349
4,562,351 A 12/1985 Atherton
4,745,277 A 5/1988 Banar
5,184,016 A * 2/1993 Ronan et al. .................. 250/288
6,379,076 B1 * 4/2002 Reinhold et al. .............. 403/348
6,448,565 B1 * 9/2002 Erath .......................... 250/423 R
2005/0258361 A1 * 11/2005 Whitehouse et al. ......... 250/288
2005/0258374 A1 * 11/2005 Ellefson et al. ............... 250/427
2006/0060771 A1 3/2006 Grossenbacher
2006/0273252 A1 12/2006 Hayden
2009/0208282 A1 * 8/2009 Hale ............................. 403/349
2011/0089333 A1 4/2011 Ferrara et al.

FOREIGN PATENT DOCUMENTS

| JP | 04-313050 | 11/1992 |
| JP | 05-251031 | 9/1993 |
| JP | 06-035983 | 5/1994 |
| JP | 08-195185 | 7/1996 |
| JP | 10-040853 | 2/1998 |
| JP | 11-201902 | 7/1999 |

OTHER PUBLICATIONS

IPRP for PCT/US2010/051896.

* cited by examiner

Primary Examiner — Daniel P Stodola
Assistant Examiner — Johnathan Masinick
(74) Attorney, Agent, or Firm — Rhodes IP PLC; Christopher R Rhodes

(57) ABSTRACT

Certain embodiments described herein are directed to couplers that can be used to provide a seal between a source assembly and a vacuum chamber. In certain examples, the seal can be provided upon movement of a moveable component of the coupler. In some examples, rotation of the moveable component is operative to provide an axial force to a stationary component coupled to the moveable component such that the stationary component is biased to provide a suitable seal to the vacuum chamber.

20 Claims, 13 Drawing Sheets

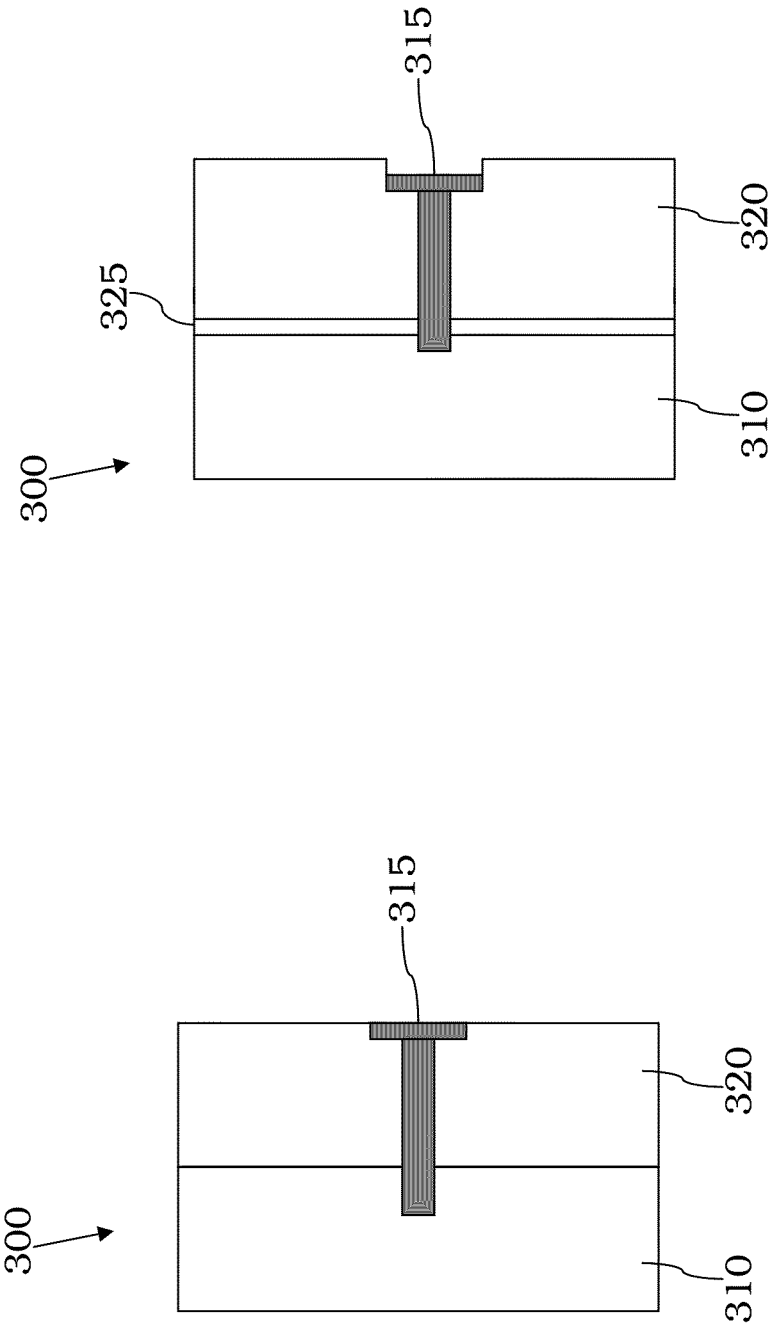

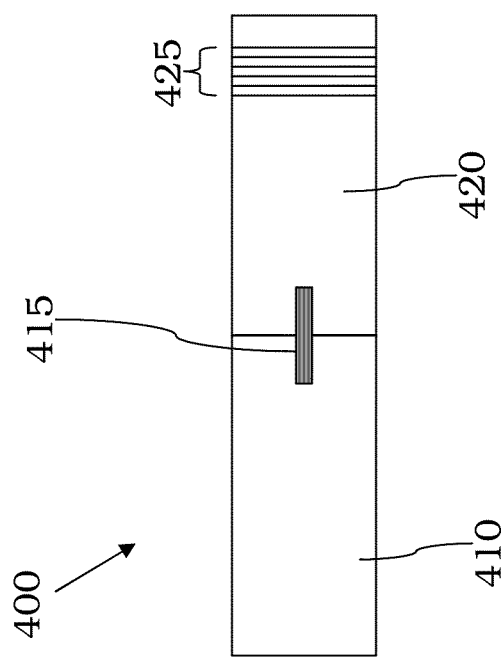

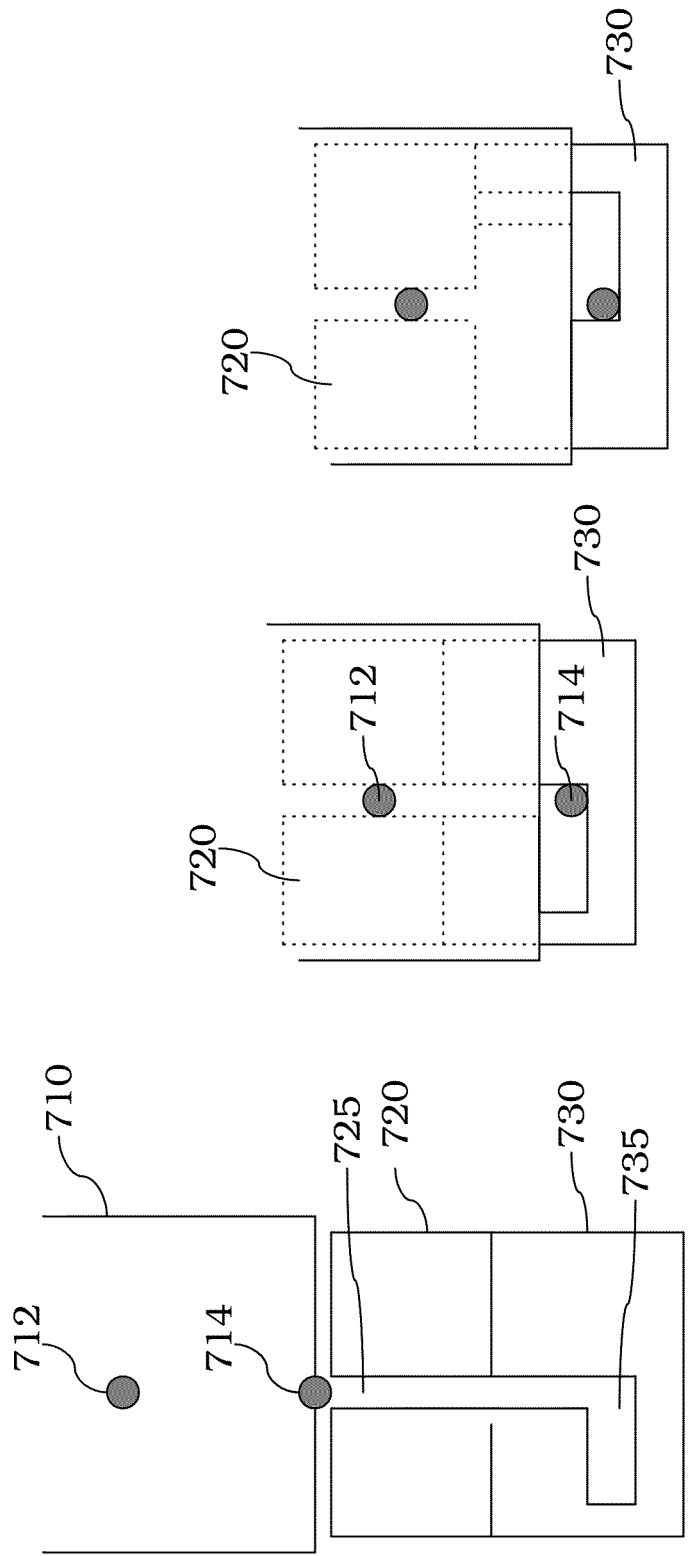

COUPLING DEVICES AND SOURCE ASSEMBLIES INCLUDING THEM

PRIORITY APPLICATION

This application is a non-provisional application of, and claims priority to, U.S. Provisional Application No. 61/249,779 filed on Oct. 8, 2009, the entire disclosure of which is hereby incorporated herein by reference for all purposes.

TECHNOLOGICAL FIELD

This application is related to sources and devices for coupling sources to an instrument or other device. More particularly, certain embodiments are directed to assemblies configured to couple to each other in a desired manner.

BACKGROUND

Many devices use an ion source or an electron source to provide ions or particles. During insertion of the source into a device, mechanical fasteners are typically used to retain the source within the device. The source may require removal for cleaning and is susceptible to damage upon reinsertion of the source into the device or instrument.

SUMMARY

In a first aspect, an assembly comprising a moveable component configured to provide an axial force upon movement in a first direction and release the axial force upon movement in a second direction, and a stationary component coupled to the moveable component and configured to receive the axial force from the moveable component, the stationary component configured to provide a seal at a sealing face of a device upon the provision of the axial force from the moveable component.

In certain embodiments, the moveable component can be configured as a rotatable component that provides the axial force to the stationary component upon rotation of the moveable component in the first direction. In other embodiments, the provided axial force can be released upon rotation from the first direction to the second direction. In some embodiments, the moveable component can be configured to provide the axial force upon depression of the moveable component in the same direction as the axial force. In certain examples, the moveable component can be configured to provide the axial force upon mating of threads on the stationary component. In other examples, the stationary component can be configured to remain stationary upon movement of the moveable component to provide the axial force. In some examples, the device comprises at least one pin configured to receive a slot on the moveable component to position the assembly in the device. In additional examples, the stationary component can include a slot configured to receive another pin on the device to align the assembly in the device. In some embodiments, rotation of the moveable component is operative to provide the axial force to the stationary component without substantial rotational movement of the stationary component. In further embodiments, the moveable component can be configured to provide the axial force that provides the seal without the use of any external fasteners.

In certain embodiments, the moveable component can be configured as a cam locking device and the device is an instrument housing. In other embodiments, the cam locking device can be coupled to the stationary component through a spring-loaded shaft. In yet further embodiments, the instrument housing comprises a guide block with a detent to lock the cam once the cam is rotated to provide the axial force. In some embodiments, the instrument housing can include a pin that slidingly engages a slot in the cam to provide the axial force to the vacuum port. In certain examples, the stationary component is coupled to another pin on the instrument housing to prevent movement of the stationary component during the circumferential sliding of the pin along the slot in the cam. In some examples, the moveable component comprises more than a single moveable component to provide the axial force. In other examples, the assembly can be configured to inserted into the device in only a single orientation. In further examples, the device comprises a set of pins offset at an angle other than 180 degrees to permit insertion of the assembly in only a single orientation. In additional examples, the assembly comprises at least one slot positioned to receive a pin from the set of pins.

In an additional aspect, a source assembly comprising a moveable component and a stationary component coupled to the moveable component is provided. In certain examples, the moveable component can be configured to provide an axial force upon movement in a first direction and release the axial force upon movement in a second direction. In some embodiments, the stationary component can be configured to receive the axial force from the moveable component. In certain instances, the stationary component can comprise a source coupled to a vacuum port. In some configurations, the vacuum port can be configured to provide a substantially fluid tight seal at a sealing face of a vacuum chamber in a device upon the provision of the axial force from the moveable component.

In certain examples, the source can be an ion source, an electron source or other suitable sources. In other examples, the moveable component can be configured as a rotatable component that provides the axial force to the stationary component upon rotation of the moveable component in the first direction. In additional examples, the provided axial force can be released upon rotation from the first direction to the second direction. In some examples, the moveable component can be configured to provide the axial force upon depression of the moveable component in the same direction as the axial force. In other examples, the moveable component can be configured to provide the axial force upon mating of threads on the stationary component. In certain embodiments, the stationary component can be configured to remain stationary upon movement of the moveable component to provide the axial force.

In additional embodiments, the device can comprise at least one pin configured to receive a slot on the moveable component to position the source assembly in the device. In other embodiments, the stationary component can comprise a slot configured to receive another pin on the device to align the source assembly in the device. In further embodiments, rotation of the moveable component can be operative to provide the axial force to the stationary component without substantial rotational movement of the stationary component. In further embodiments, the moveable component can be configured to provide the axial force that provides the substantially fluid tight seal without the use of any external fasteners.

In certain examples, the moveable component can be configured as a cam locking device and the device is an instrument housing or is positioned within the instrument housing. In other examples, the cam locking device can be coupled to the vacuum port through a spring-loaded shaft. In some examples, the instrument housing can comprise a guide block comprising one or more pins to lock the cam once the cam is rotated to provide the axial force. In additional examples, the instrument housing can comprise a pin that slidingly engages a slot in the cam to provide the axial force to the vacuum port. In certain examples, the stationary component can be coupled to another pin on the instrument housing to prevent movement of the stationary component during the circumferential sliding of the pin along the slot in the cam.

In some examples, the moveable component can comprise more than a single moveable component to provide the axial force. In other examples, the source assembly can be configured to be inserted into the device in only a single orientation. In additional examples, the device can comprise a set of pins offset at an angle other than 180 degrees to permit insertion of the source assembly in only a single orientation. In further examples, the source assembly can comprise at least one slot positioned to receive a pin from the set of pins.

In another aspect, a source assembly comprising a coupler configured to couple the source assembly to an instrument housing to provide a substantially fluid tight seal between the source assembly and a vacuum chamber in the instrument housing upon coupling of the source assembly to the instrument housing and movement of the coupled coupler is described.

In certain embodiments, the coupler can include a slot configured to couple to a pin of the instrument housing. In other examples, the pin can be oriented on the instrument housing such that the source assembly will couple to the instrument housing in a single orientation. In some examples, the coupler, upon rotation, can be configured to provide the substantially fluid tight seal without using any external fasteners. In additional examples, the coupler can be configured as a cam that can be constructed and arranged to provide the substantially fluid tight seal between the source assembly and the instrument housing upon rotation of the coupled coupler.

In other embodiments, the coupler can comprises a set of slots. In some embodiments, the set of slots can be positioned offset such that the source assembly can be coupled to the instrument housing in a single orientation. In certain embodiments, the instrument housing can comprise a guide block configured to stop insertion of the source assembly. In some examples, the guide block can include a detent to lock the source assembly into place when the coupler is rotated to provide the substantially fluid tight seal. In further examples, the coupler can be configured to rotate around a longitudinal axis and apply an axial force to seal the source assembly to the vacuum chamber. In some examples, the coupler can be configured as a handle that comprises a first slot configured to couple to a guide pin on the instrument housing, and in which rotation of the handle is operative to axially bias the source assembly toward the vacuum chamber. In certain embodiments, the source assembly can be configured to couple to the vacuum port to provide a substantially fluid tight seal upon rotation of the coupler in less than five seconds from insertion of the source assembly in the instrument housing to the provision of the substantially fluid tight seal.

In certain examples, the coupler can be configured as a cam with a handle, the cam is coupled to a vacuum port through a spring loaded center shaft, the source assembly comprises a housing sized and arranged to couple to a bore of a guide block of the instrument housing, the guide block further comprises a set of pins constructed and arranged to couple to a slot in the vacuum port and a slot in the handle, in which insertion of the pins into the slots and subsequent rotation of the handle provides a substantially fluid tight seal between the vacuum port and a sealing face of the vacuum chamber. In some examples, the vacuum port can be configured to remain substantially stationary during rotation of the handle. In other examples, the cam is configured to decouple the coupled source assembly upon rotation of the handle in an opposite direction. For example, the guide can be configured to axially position the source and slots can be present and configured to rotationally position the source, e.g., to prevent damage of components in the source.

In certain embodiments, the coupler can be configured to rotate to provide the substantially fluid tight seal between the source assembly and a vacuum chamber while the remainder of the source assembly remains stationary. In other embodiments, a pin on the instrument housing can be configured to keep the remainder of the source assembly stationary during rotation of the coupler. In some embodiments, a slot on the coupler that can be configured to slidingly engage another pin of the instrument housing during rotation of the coupler. In further embodiments, a detent can be present on the slot and configured to lock the another pin into position.

In additional embodiments, the coupler can be configured as a push button to provide the axial force upon a first push and to release the axial force upon a second push.

In an additional aspect, a method of coupling a source assembly to a device is provided. In certain examples, the method includes inserting the source assembly into a vacuum chamber of the device, and sealing the source assembly to the vacuum chamber by movement of a moveable component on the inserted source assembly to couple the source assembly to the vacuum chamber. In some examples, the method can be implemented without using external fasteners.

In certain embodiments, the method can include rotating the moveable component to provide the seal between the source assembly to the vacuum chamber. In other embodiments, the method can include rotating the moveable component until a pin on an instrument housing including the vacuum chamber engages a detent on a slot of the moveable component.

In further embodiments, the method can include depressing a button on the moveable component to provide the seal between the source assembly to the vacuum chamber. In additional embodiments, the method can include depressing the button a second time to release the seal between the source assembly to the vacuum chamber.

In certain examples, the method can include configuring the source assembly with a stationary component coupled to the moveable component, the stationary component comprising a vacuum port configured to seal to a sealing face of the vacuum chamber upon movement of the moveable component. In some examples, the method can include configuring the moveable component as a cam with a handle, and providing the seal upon rotation of the handle of the cam.

In additional examples, the method can include engaging threads on the moveable component with threads on a device including the vacuum chamber to provide the seal. In further examples, the method can include coupling pins on one component with holes on the other component to provide the seal.

In another aspect, a mass spectrometer comprising a source assembly comprising a coupler configured to couple the source assembly to an instrument housing of the mass spectrometer to provide a substantially fluid tight seal between the source assembly and a vacuum chamber in the instrument housing upon coupling of the source assembly to the instrument housing and movement of the coupled coupler is provided.

In certain embodiments, the source assembly can include a moveable component configured to provide an axial force upon movement in a first direction and release the axial force upon movement in a second direction. In some embodiments, the source assembly can include a stationary component coupled to the moveable component and configured to receive the axial force from the moveable component. In other examples, the stationary component can include a source coupled to a vacuum port, the vacuum port configured to provide a substantially fluid tight seal at a sealing face of a vacuum chamber in the instrument housing of the mass spectrometer upon the provision of the axial force from the moveable component. In certain examples, the moveable component can be configured to provide the axial force upon depression of the moveable component in the same direction as the axial force. In other examples, the moveable component can be configured to provide the axial force upon mating of threads on the moveable component with threads on the device.

In some embodiments, the coupler used with the mass spectrometer can be configured to provide the axial force without using external fasteners. In other embodiments, the coupler used with the mass spectrometer can be configured as a cam with a handle. In certain embodiments, the cam can be coupled to a vacuum port through a spring loaded center shaft, and the source assembly can comprise a housing sized and arranged to couple to a bore of a guide block of the instrument housing. In some examples, the guide block further comprises a set of pins constructed and arranged to couple to a slot in the vacuum port and a slot in the handle, in which insertion of the pins into the slots and subsequent rotation of the handle provides the substantially fluid tight seal between the vacuum port and a sealing face of the vacuum chamber. In other examples, the vacuum port can be configured to remain substantially stationary during rotation of the handle. In additional examples, the source assembly can be an ion source. In further examples, the instrument housing can include a set of pins offset at an angle other than 180 degrees to permit insertion of the source assembly in only a single orientation. In certain examples, the mass spectrometer can include a fluid chromatography system fluidically coupled to the mass spectrometer.

Additional features, aspect, examples and embodiments are described in more detail below.

BRIEF DESCRIPTION OF THE FIGURES

Certain embodiments are described with reference to the figures in which:

FIGS. 3A and 3B are illustration of a source assembly including a moveable component with a depressable plunger, in accordance with certain examples;

FIG. 4 is an illustration of a source assembly including a moveable component with external threads, in accordance with certain examples;

FIGS. 7A-7C are illustrations showing insertion of a source assembly into a housing and subsequent rotation of a moveable component of the source assembly, in accordance with certain examples;

Figure 1:
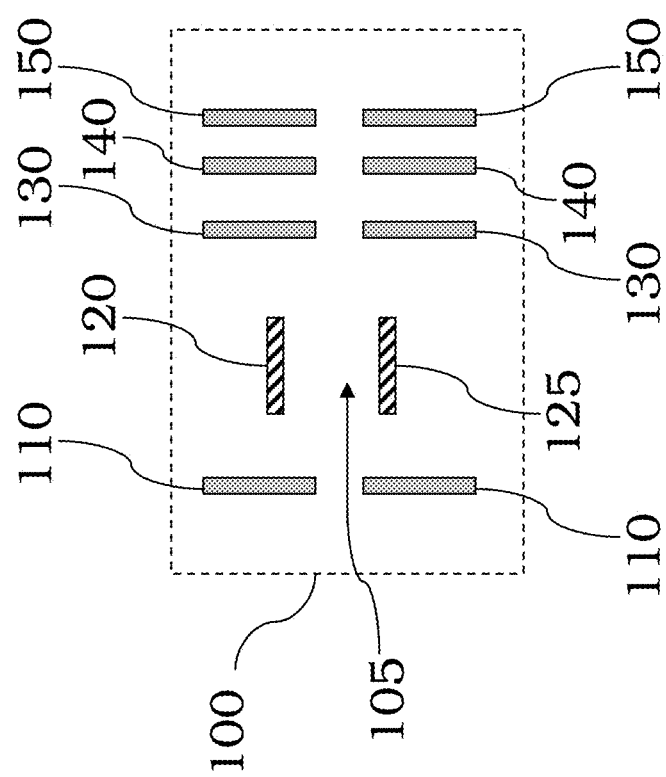
FIG. 1 is an illustration of an ion source, in accordance with certain examples.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. Where dimensions are specified in the description below, the dimensions are provided for illustrative purposes only. Where a moveable component is moved, the amount or degree of movement is not critical and may be varied depending on the exact configuration of the various components present.

DETAILED DESCRIPTION

Certain embodiments of the devices described herein can be used to provide assemblies that can align and/or seal to a device or larger component through a wall or interface. In some examples, the assembly can be used in a vacuum chamber or a pressure vessel, whereas in other examples, there can be zero pressure differential between the assembly and the device to which it is coupled. In certain examples, the assembly can be used with a source including, but not limited to, ion sources, electron sources, in ion beam systems, in electron beam systems, in systems with ion guns or electron beams or in particle sources or other sources that provide particles or ions to a desired area or space in an instrument or system.

In certain embodiments, source assemblies can be damaged during insertion into an instrument housing. Scientific instrumentation often requires sensitive components to be accurately placed within a vacuum chamber. An example is an ion or electron source for a mass spectrometer. These sources require accurate radial positioning to prevent damage from users inadvertently bumping the precision ion optics against the side walls of the vacuum chamber which can lead to a decrease in system performance or expensive repairs. Most vacuum systems have access ports that require screws to fasten to maintain the seal. These screws are time consuming and are cumbersome to the user. Other vacuum ports are opened with quick connects cam features that do not accurately position the components being inserted into the vacuum chamber (see U.S. Pat. No. 4,998,004). Although there are mechanisms to accomplish a quick seal, unfortunately these methods do not provide accurate positioning and quick access into the chamber.

Certain embodiments described herein provide source assemblies that permit placing or assembling sensitive components within a vacuum chamber that can reduce or even remove the possibility of user-caused damage to the source in the manner described above. Further, a user can access the components easily without the need of tools. As is described herein in reference to certain embodiments, no additional hardware or fasteners are needed for securing a component, such as a source, into the vacuum chamber. Embodiments of the source assemblies described herein can provide accurate radial and axial alignment while preventing damage to sensitive components of the source when a twisting motion of the access port is not permissible and no screws or additional fasteners are desired to secure and seal it to the vacuum chamber.

In certain examples, the source assemblies described herein typically include a coupler constructed and arranged to provide a seal to a vacuum chamber in a device such as an instrument. In some examples, the couplers of the source assemblies described herein can be configured in many different configurations and manners. In certain examples, the coupler can be configured to axially bias the source assembly toward a sealing face of a vacuum chamber to provide a substantially fluid tight seal between the source assembly and the vacuum chamber. In other examples, the coupler can be configured with one or more features to prevent incorrect insertion of the source assembly into the instrument housing. In additional examples, the coupler can be coupled or connected to a stationary component that comprises a vacuum port. In operation of the coupler, movement of the coupler can act to bias the vacuum port toward a sealing face of the vacuum chamber to provide a substantially fluid tight seal between the vacuum port and the vacuum chamber. If desired, the coupler can be designed such that it is properly configured to provide a substantially fluid tight seal without using any external fasteners. These and other configurations are described in more detail below.

In certain embodiments, the ability of the source assemblies provided herein to rapidly couple and decouple to an instrument permits easy and fast removal of the source assemblies for cleaning or servicing. The coupler can be designed to facilitate proper insertion and alignment of the source assembly components in the instrument such that less downtime is required for service. For example, where the source assembly is present in a mass spectrometer, the source assembly can be removed without the need for using any tools, can be disassembled and cleaned, and then reassembled and coupled back to the instrument housing for subsequent operation.

In certain embodiments, the couplers can be present on an ion source assembly. One illustration of an ion source assembly is shown in FIG. 1. A typically ion source can include numerous components including, for example, a repellor 110, a filament 120, and a plurality of lenses 130, 140, and 150 in a housing 100. Electrons can be omitted from the filament 120 when the filament 120 is heated. The electrons can be accelerated toward an anode 125 using a potential difference between the anode 125 and the filament 120. A gas stream 105 comprising a sample can be provided substantially perpendicular to the direction which the electrons are accelerated. The accelerated electrons collide with the sample and cause ionization of the sample, e.g., production of singly charged positive ions. The positively charged ions are attracted by the lens 130 by creating a potential difference between the lens 130 and the repellor 110. The lens 130, along with the lenses 140 and 150 can focus or manipulate the ion beam such that it is passed to a desired device. The ion source shown in FIG. 1 is merely illustrative, and different ion sources can include different components or other components than the ones shown in FIG. 1. For example, in certain configurations the filament can be positioned outside the ion source body, there may not be a repellor in certain instances or the repellor may be a solid surface without holes or gaps. In other configurations, the source may not include an anode, the gas may enter out of the plane of FIG. 1, and/or ions may be negatively charged. Notwithstanding that the particular source configuration can be highly variable, the couplers described herein can be used with many different types of source configurations. In addition, different types of sources including electron sources and particle sources are described in more detail herein.

In certain embodiments, in operation of a device including the source assemblies described herein, a pressure differential is typically present such that pressures inside an instrument or device are substantially lower than atmospheric pressure. The use of lower pressures permits selection, direction or focusing of desired ions or particles without interference from unwanted species. Due to the lower operating pressures, it is desirable that the source assemblies provided herein provide a substantially fluid tight seal at desired portions or interfaces. For example, a source assembly can be coupled to a vacuum port which is designed to interface with a sealing face of a vacuum chamber to provide a substantially fluid tight seal between the vacuum port and the vacuum chamber. Such a seal prevents unwanted leaks and allows operation of the device at lower than atmospheric pressures, e.g., using one or more pumps fluidically coupled to the vacuum chamber. Embodiments of the source assemblies disclosed herein can provide a substantially fluid tight seal while at the same time being configured for rapid removal and insertion.

In certain examples, a source assembly can include a moveable component and a stationary component. The terms "moveable" and "stationary" are used for convenience purposes and in reference to insertion of the source assembly into a device or instrument. When the source assembly is inserted, it is desirable that a portion of the source or components connected thereto, e.g., a vacuum port, remain stationary relative to a longitudinal axis such that misalignment is not achieved. For example, the stationary component is desirable moved along a direction parallel to the longitudinal axis but off-axis and rotational movements are desirably limited such that the proper centerline for the source, when inserted, is maintained. The stationary component typically includes the desired source components and any vacuum port or other interface suitable to seal to a vacuum chamber of a device. The moveable component can be coupled to the stationary component and operate to force or push the stationary component to a sealing face of a vacuum chamber or to otherwise provide a force that keeps the stationary component coupled to or against a sealing face.

In certain examples, the exact configuration of the moveable component and the stationary component can vary. It is desirable that the moveable component be connected to the stationary component such that a unitary source can be provided and used. It is possible, however, that the moveable component and the stationary component be packaged separately such that an end user can couple a selected type of moveable component to a stationary component. Where such components are coupled by an end-user, suitable linkages or other couplers may be used between the two components, e.g., a shaft, a rod, a spring, a spring-loaded shaft, a set of fasteners, etc., such that the two components are securely held to each other during operation of the source.

Figure 2:
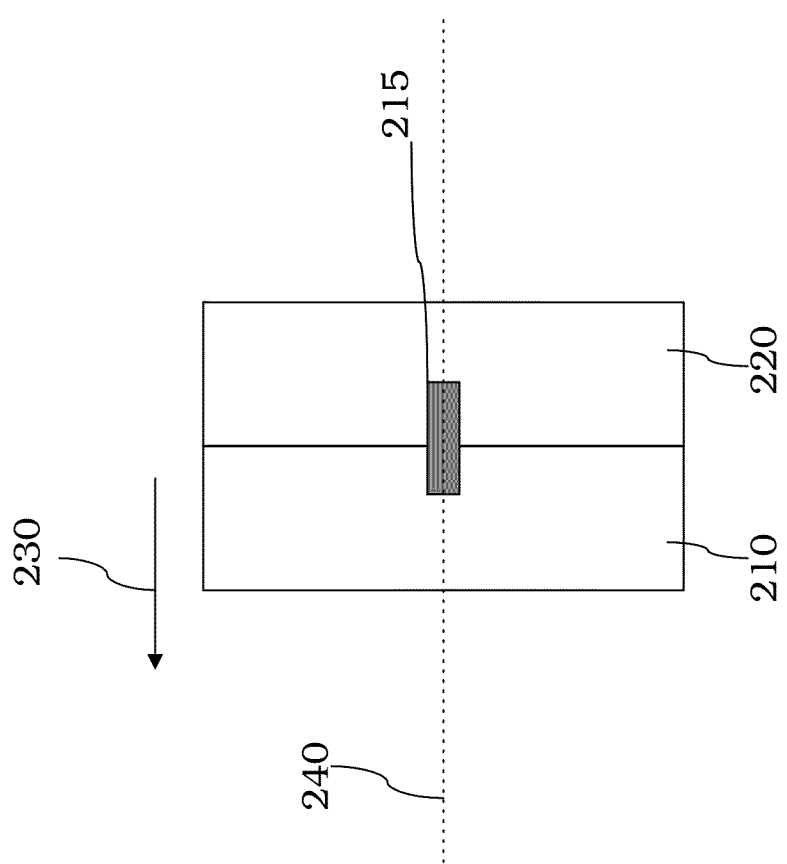
FIG. 2 is an illustration of a source assembly including a moveable component and a stationary component, in accordance with certain examples.

In certain embodiments, a side-view of one configuration of a source including a moveable component and a stationary component coupled to each other is shown in FIG. 2. A stationary component 210 is coupled to a moveable component 220 through a spring-loaded center shaft 215. The stationary component 210 typically includes the various source component such as, for example those described in reference to FIG. 1. The moveable component 220 can be configured to provide an axial force in the direction of arrow 230 such that movement of the moveable component 220, e.g., rotation around the longitudinal axis 240, results in a force being applied to the stationary component 210 in the direction of the arrow 230. The result of the axial force is that the stationary component 210 is forced and held outward in the direction of arrow 230, which can result in a tight fit between the stationary component 210 and any face or surface resting against or near the stationary component 210.

In certain embodiments, the moveable component 220 is rotated around the longitudinal axis 240 by a desired angle. For example, where the moveable component 220 is configured as a cam or cam locking device, the moveable component can be rotated thirty degrees or more to provide a sufficient force to bias the stationary component 210 toward a sealing face. In some configurations, the amount of force provided by the moveable component 220 can be increased by further rotation of the moveable component 220. It is desirable that the moveable component 220 not provide an unneeded amount of force that might result in damage to the source components. In some examples, the moveable component can be configured such that movement is limited within a desired range, e.g., where rotation is used, the moveable component may be limited to rotating no more than 30 degrees, 45 degrees, 60 degrees, 90 degrees, 105 degrees, 120 degrees, 135 degree, 150 degrees, 165 degrees, 180 degrees or any value between these illustrative values.

In certain configurations, movement can be limited by including stops or detents within the moveable component itself such that movement is limited between the two positions. In additional examples, movement can be unlimited, but indicia on the source assembly or the device to which the source assembly is intended to be coupled can be used to provide guidance for the desired amount of movement. For example, the device can include a first marking that is intended to align with a marking on the moveable component. The source assembly can be inserted into the device, and the moveable component can be rotated until the marking on the moveable component aligns with a marking on the device. In this manner, a desired amount of force can be provided to the stationary component without the need to include a stop or other device on the moveable component. If desired, the marking can be configured as depressions such that a key or pin can be inserted into them to retain the moveable component in a desired stationary position. Such keys or pins are optional and not required to provide the proper seal of the stationary component to the device.

In certain examples, the moveable component can be configured with a button or plunger, e.g., a spring-loaded plunger such that depression of the plunger acts to provide an axial force to the stationary component. One such example is shown schematically in FIGS. 3A and 3B. In certain embodiments and referring to FIG. 3A, the source 300 can include a stationary component 310 and a moveable component 320. A plunger 315 in the moveable component 320 is coupled to the stationary component 310 such that depression of the plunger 315 (see FIG. 3B) applies an axial force which pushes the stationary component 310 away from the moveable component 320 and creates a space 325 between the two components 310 and 320. The plunger 315 can be spring loaded such that a subsequent depression of the plunger 315 will permit the stationary component 310 to move back toward the moveable component 320 as shown in FIG. 3A. The moveable component 310 is desirably coupled to device or housing of the device such that the moveable component can not be pushed away from the device once the source assembly 300 is coupled to the device. For example, the moveable component can be coupled 310 to the device using external fasteners, if desired, or can be coupled to the device without any external fasteners, e.g., through pins, slots or the like which are part of the moveable component 310 and/or housing of the device.

In some examples, the moveable component can include external threads which mate to threads of the device to which the source assembly is to be coupled. Such threads are shown schematically on a source assembly illustrated in FIG. 4. The source assembly 400 includes a stationary component 410 coupled to a moveable component 420 through a center shaft 415, which permits the moveable component 420 to be rotated while the stationary component 410 remains stationary. During insertion of the source 400 assembly 400 into a device, the source is inserted into external threads 425 engage internal threads on the device (not shown). Rotation of the moveable component, e.g., in a clockwise direction, can result in securing the source assembly 400 to the device. The stationary component 410 does not rotate during rotation of the moveable component 420, but rotation of the moveable component 420 acts to provide an axial force on the stationary component 410 and pushes the stationary component 410 toward a sealing face of a vacuum chamber. The source assembly 400 can be tightened to a desired torque setting or can include indicia or features, as discussed below, to prevent over insertion of the source assembly 400 into a device such as a mass spectrometer instrument. In some examples, the device to which the source assembly 400 is to be inserted can include one or more locking features, e.g., a pin, that engages or couples to the stationary component 410 such that rotation of the stationary component is not permitted during movement of the moveable component 420. Such illustrative locking features are described in more detail below.

Figure 5A:
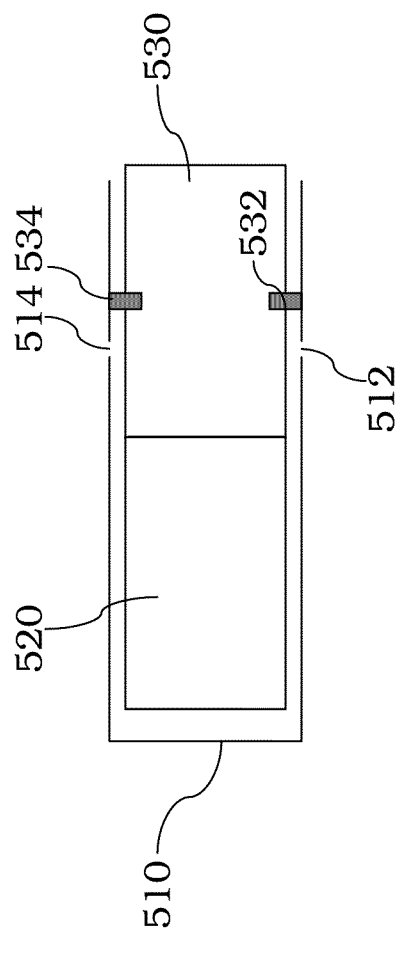
FIG. 5 is an illustration of a source assembly including extendible spring-loaded pins that can engage a device housing, in accordance with certain examples.
Figure 5B:
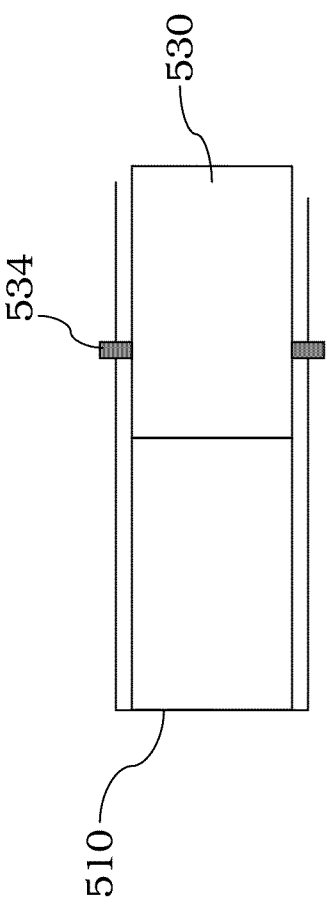

In other examples, the moveable component can include spring-loaded features such as a spring-loaded pin that can engage holes or apertures in the device housing and secure the source assembly into the device. Illustrations of this configuration are shown in FIGS. 5A and 5B. Referring to FIG. 5A, a device housing 510 is shown with a partially inserted source assembly including a stationary component 510 and a moveable component 530. The moveable component include spring-loaded pins 532 and 534 which are in a partially depressed state due to the device housing 510. As the source assembly is inserted further into the device housing 510 (see FIG. 5B), the spring-loaded pins 532 and 534 pop up into apertures 512 and 514, respectively, which secures the source assembly in place and provides the proper position and force to seal the stationary component to a desirable face or component in the device housing 510. While two pins 532 and 534 are shown in FIGS. 5A and 5B, fewer than two or more than two pins can be present. For example, it can be desirable to use three pins spaced 120 degrees from each other to provide for a more constant axial force. Other configurations with more than three pins can also be used. While not shown, the pins 532 and 534 can be coupled to a plunger in the moveable component 530 such that depression of the plunger is operative to retract the pins 532 and 534 and permit removal of the source assembly from the device housing. For example, depression of the plunger can depress springs coupled to the pins 532 and 534 permitting retraction of the pins and subsequent removal of the source assembly from the device housing 510.

In certain embodiments, the device to which the source assembly is coupled can include one or more features which act in a cooperative manner with one or more features on the source assembly. Such features can be configured to provide for several results including, but not limited to, alignment of the source components in the device, proper insertion depth of the source assembly into the device, insertion of the source assembly in a proper orientation into the device, or proper movement of the moveable component after insertion of the source assembly into the device.

Figure 6B:
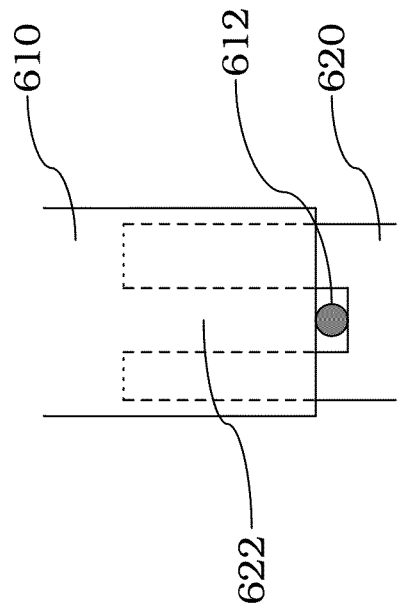
FIGS. 6A and 6B are illustrations showing insertion of a source assembly into a housing, in accordance with certain examples.
Figure 6A:
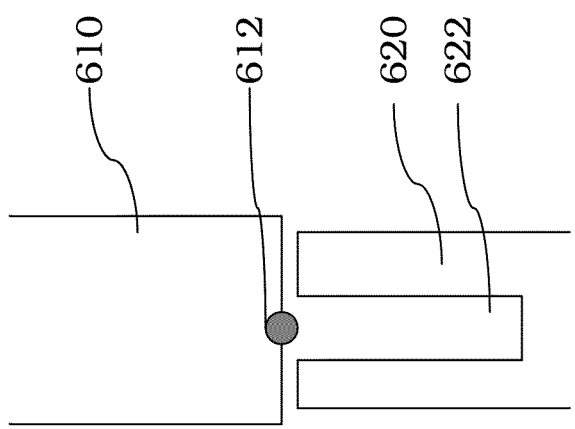

Illustrations of such a feature is shown in FIGS. 6A and 6B. The instrument or device housing 610 can include a pin 612 which is operative to slide along or slidingly engage a slot 622 in the source assembly 620. During insertion of the source assembly 620 into the housing 610, the pin 612 moves in direction parallel to the longitudinal axis of the source assembly 610 until it rests against a terminal end of the slot 622 (see FIG. 6B). This configuration permits over insertion of the source assembly into the device housing 610 but does not necessarily operate to provide the axial force. One or more additional features such as those described in reference to FIGS. 2-5B, for example, may be used in the moveable component to provide a desired axial force.

In some examples, it may be desirable to include more than a single pin on the device housing to facilitate coupling of the source assembly to the device housing. Illustrations of a device housing including more than one pin are shown in FIGS. 7A and 7B. Referring to FIG. 7A, the device housing 710 includes pins 712 and 714. A source assembly include a stationary component 720 and a moveable component 730. The stationary component 720 and moveable component 730 also include a slot 735 that traverses between them and has a generally perpendicular portion in the moveable component 730. During insertion of the source assembly into the housing 710, the guide pins 712 and 714 slidingly engage the slot 735 until pin 714 rests against the terminal portion of the slot 735 (see FIG. 7B). The pin 712 is adjacent to the stationary component 720 and the pin 714 is adjacent to the moveable component 730. The moveable component 730 can be rotated such that the pin 714 slidingly engages the perpendicular arm of the slot 735, but the position of the pin 714 prevent rotational movement of the stationary component 720. Rotation of the moveable component 730 can continue until the pin 714 is adjacent to the terminal portion of the perpendicular arm of the channel 735 (see FIG. 7C). Rotation of the moveable component 730 in a clockwise manner can provide an axial force (in an upward direction in FIGS. 7A-7C) such that the stationary component 720 is pushed against a face of the housing. In particular, the moveable component 730 can be configured with a spring, a cam or comparable components such that rotational movement of the moveable component 730 is translated into axial movement by the stationary component 720 to provide a seal between the stationary component 730 and a vacuum chamber sealing face present in the device housing 710.

In certain embodiments, movement of the moveable component can be limited by one or more features on a device to which the source assembly is to be coupled or by features on the source assembly itself. FIGS. 7A-7C show the use of pins which limit the degree to which the moveable component can be rotated. In some examples, the moveable component itself can include a lip or lid that prevents over insertion into the device housing. For example, the outermost portion of the moveable component can include a lip whose diameter is larger than that of the instrument housing to prevent insertion of the source assembly beyond the lip. Similarly, radial projections or extension can also be used to prevent insertion of the source assembly too far into the device. In certain examples, it is desirable to use such features in combination with the coupling features described herein such that proper insertion of the source assembly can be performed in a rapid manner.

In certain examples, the couplers and source assemblies described herein can be configured as many different types of sources. For example the couplers can be used in an electron source to provide an electron beam. One configuration of an electron source includes a tungsten filament which functions as a cathode. A voltage is applied to the tungsten filament, which causes it to heat up and eject electrons. An anode is positioned such that the ejected electrons are accelerated toward the anode and pass down a column or guide as an electron beam. Filaments other than tungsten, e.g., lanthanum hexaboride, rhenium based filaments, etc., can be used in place of the tungsten, and the electron source can include suitable electronics such as a power supply, resistors, etc. to provide a desired result.

Figure 8:
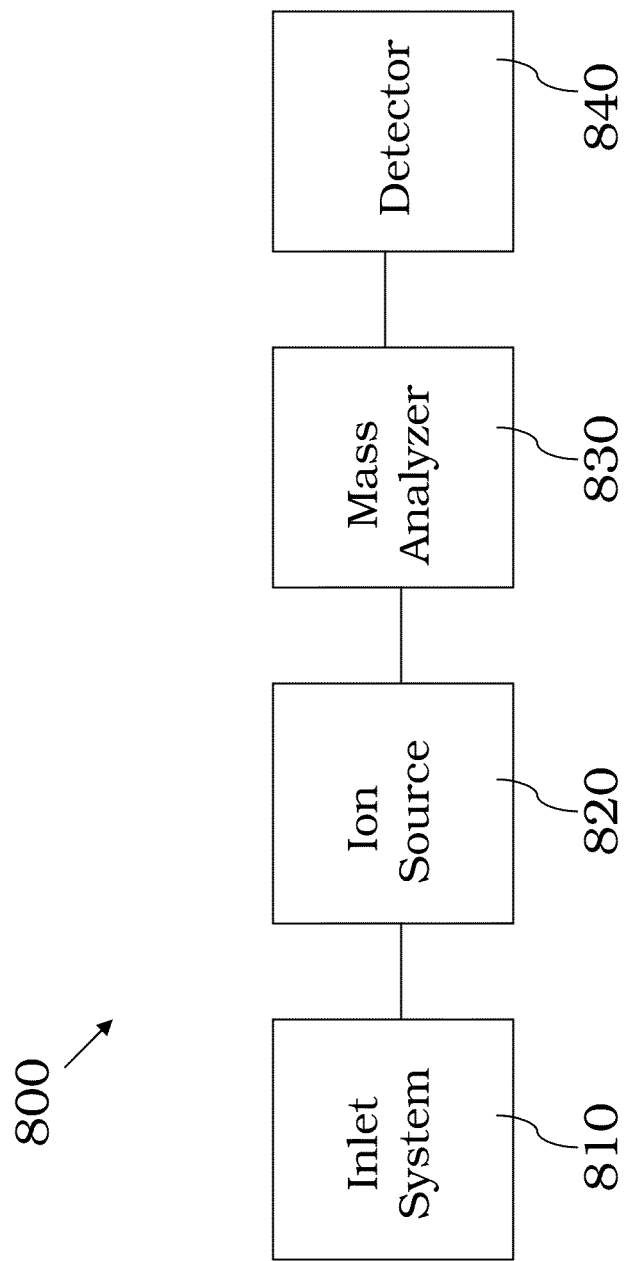
FIG. 8 is a block diagram of a mass spectrometer, in accordance with certain examples.

In other examples, the couplers can be used in a field emission gun. A field emission gun is similar to an electron beam except a Müller-type emitter is held at several kilovolts negative potential relative to a nearby electrode such that there is a sufficient potential gradient at the emitter surface to cause field electron emission. Emitters are typically either of cold-cathode type, e.g., usually produced from single crystal tungsten sharpened to a tip radius of about 100 nm, or of the Schottky type, in which thermionic emission is enhanced by barrier lowering in the presence of a high electric field. Schottky emitters can be produced by coating a tungsten tip with a layer of zirconium oxide, which has the unusual property of increasing in electrical conductivity at high temperature. Field emission guns can be used in electron microscopes to provide an electron beam that is smaller in diameter, more coherent and with up to three orders of magnitude greater current density or brightness than can be achieved with conventional thermionic emitters such as tungsten or lanthanum hexaboride-tipped filaments. The result in both scanning and transmission electron microscopy is significantly improved signal-to-noise ratio and spatial resolution, and greatly increased emitter life and reliability compared with thermionic devices In certain examples, the couplers and source assemblies described herein can be used in a mass spectrometer. Where an ion source is present in a mass spectrometer, it can be used to ionize the analyte. The ion source used in a mass spectrometer can have different components, and for ease of illustration and without limitation, certain components of a mass spectrometer are described below. Referring to FIG. 8, a mass spectrometer 800 generally includes an inlet system 810 fluidically coupled to an ion source 820, which is fluidically coupled to a mass analyzer 830. The mass analyzer 830 is fluidically coupled to a detector 840. The operating pressure of the mass spectrometer is below atmospheric pressure (typically $10^{-5}$ to $10^{-8}$ Torr) by using a vacuum system.

In certain examples, the inlet system 810 of the mass spectrometer 800 can be any of the commonly used inlet systems including, but not limited to, batch inlet systems, direct probe inlets, chromatographic inlet systems or other common inlet systems available from PerkinElmer Health Sciences, Inc. (Waltham, Mass.). Regardless of the particular inlet system selected, the inlet system functions to permit introduction of a sample into the ion source 820 with minimal loss of vacuum.

In some examples, the mass analyzer 830 of the mass spectrometer 800 can be any commonly used mass analyzer including, but not limited to, magnetic sector analyzers, time of flight analyzers, quadrupole mass filters, ion trap analyzers including, for example, linear quadrupole ion traps, three-dimensional quadrupole ion traps, orbitraps, toroidal ion traps, cyclotron resonance or other mass analyzers available from PerkinElmer Health Sciences, Inc. or other instrument manufacturers. Regardless of the type of mass analyzer selected, the mass analyzer 830 receives ionized sample from the ion source 820 and is effective to separate ions with different mass-to-charge ratios.

In certain embodiments, the detector 840 of the mass spectrometer 830 can be any one or more of detectors commonly used in mass spectrometry including, but not limited to, an electron multiplier, a Faraday cup, photographic plates, scintillation detectors, microchannel plate detectors and other detectors. The detector 840 is fluidically coupled to the mass analyzer 830 such that it can receive separated ions from the mass analyzer for detection.

In certain examples, the ion source may be selected from gas phase sources and desorption sources and combinations thereof. For example, the source can be an electron ionization source, a chemical ionization source, a field ionization source, a field desorption source, a fast atom bombardment source, secondary ion mass spectrometry, a laser desorption source, a plasma desorption source, a thermal desorption, an electrospray ionization source, a thermospray ionization source or other sources that can be used either alone or in combination to provide a beam of an ionizing agent to a sample. In some instances, more than a single source can be present in the mass spectrometer, and a user may select a desired source. Suitable commercial source assemblies are commonly from PerkinElmer Health Sciences, Inc., and such source assemblies can be used with the technology described herein to facilitate alignment of a terminal lens with source components and to retain source components in the housing of a source assembly.

In certain embodiments, the mass spectrometers described herein can be used in tandem with another mass spectrometer or other instrument. Where tandem MS/MS is used, at least one of the MS devices can be configured as described herein, e.g., including a terminal lens with an alignment feature or a set of alignment features. One application of tandem mass spectrometers is the identification of molecular ions and their fragments by mass spectrometric analysis (MS and MS/MS, respectively). A tandem mass spectrometer performs molecular ion identification by mass-selecting a precursor ion of interest in a first stage, fragmenting the ion in a second stage, and mass-analyzing the fragment in a third stage. Tandem MS/MS instruments can be, for example, sequential in space (for example, consisting of a two quadrupole mass filters separated by a collision cell) or sequential in time (for example, a single three-dimensional ion trap).

Figure 9:
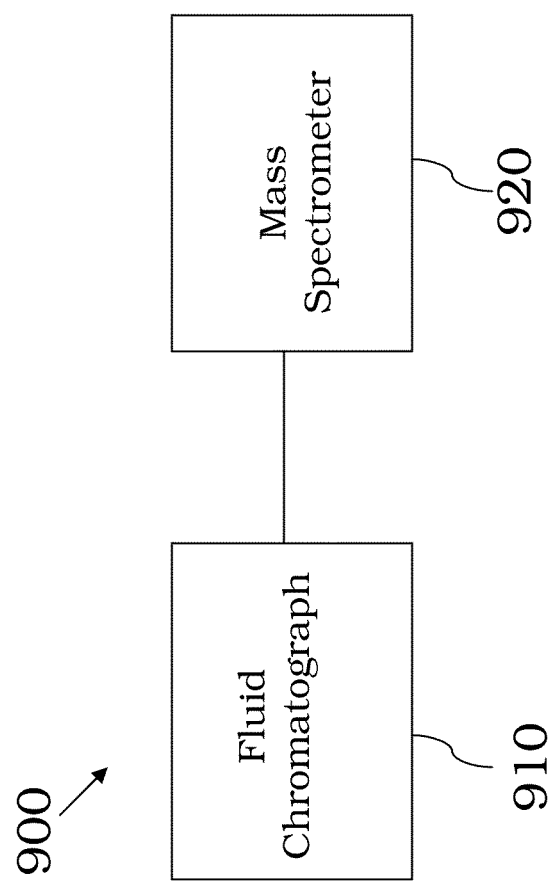
FIG. 9 is a block diagram of a fluid chromatograph fluidically coupled to a mass spectrometer, in accordance with certain examples.

In certain examples, an instrument comprising a fluid chromatograph, and a mass spectrometer is provided. The term "fluid chromatograph" is intended to encompass many different types of chromatographic devices that use a fluid, e.g., a gas, liquid, supercritical fluid, etc., including, but not limited to, gas chromatographs, liquid chromatographs, high performance liquid chromatographs, capillary electrophoresis and other chromatographs that can separate species in a fluid using differential partitioning of analytes between a mobile phase and a stationary phase or using difference in migration rates. An illustrative instrument is shown in FIG. 9. The instrument 900 includes a fluid chromatograph 910 hyphenated to a mass spectrometer 920. The fluid chromatograph 910 may be hyphenated through a suitable inlet to provide fluid flow from the fluid chromatograph 910 to the mass spectrometer 920, which typically is operating at a lower pressure than the pressure used by the fluid chromatograph 910.

The couplers and source assemblies provided herein can be used with additional devices that can benefit from rapid assembly and that use an ion source or an electron source. Illustrative devices include, but are not limited to, devices for ion implantation, e.g., those used in semiconductor fabrication, which is typically used to manufacture of integrated circuits (ICs) by implanting ions into silicon or GaAs wafers to form transistor junctions, and to dope the well regions of the p-n junctions. Other suitable devices include those used for molecular beam epitaxy, sputtering devices, ion channeling devices, processing devices for the production of nanoparticles and nanostructures and other materials engineering processes where ions or electrons are directed at a substrate. These and other uses will be recognized by the person of ordinary skill in the art, given the benefit of this disclosure.

In certain embodiments, the moveable and stationary components can include one or more internal couplers that are operative to maintain alignment of the slots in the moveable and stationary components. For example, an internal pin on the stationary component can couple to an internal hole on the moveable component to limit free rotation or movement of the moveable component when the source assembly is not coupled to a device. In some examples, the stationary component can include an internal spring loaded plunger that couples to an internal detent in the moveable component to prevent free movement of the two components relative to each other. The internal couplers can couple to each other through a friction fit such that application of enough force to the moveable component will result in decoupling of the internal couplers. In other configurations, a button or the like can be depressed to decouple the coupled internal couplers and permit movement of the moveable component relative to the stationary component.

Certain examples are described below to illustrate further some embodiments of the technology provided herein.

Example 1

Figure 10:
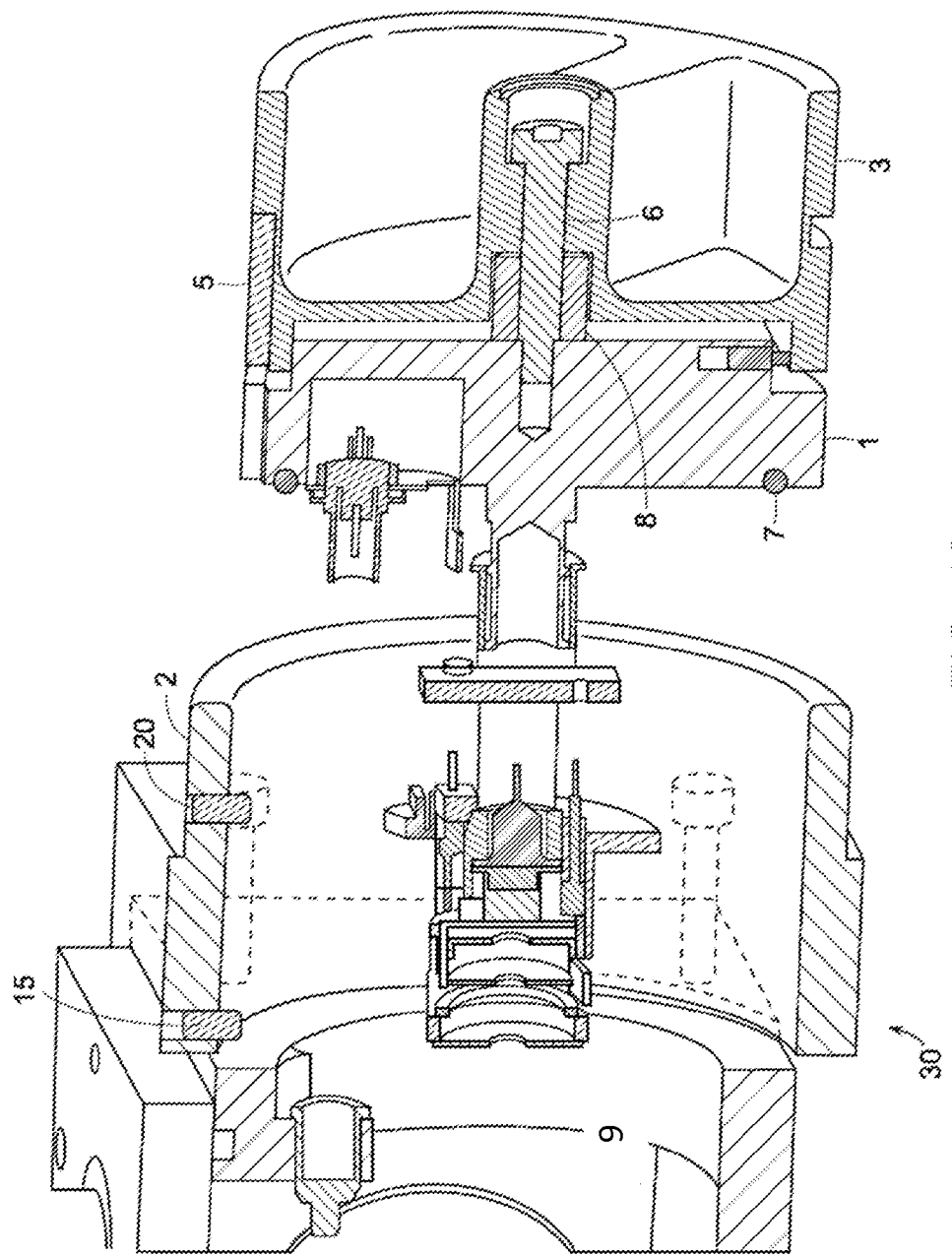
FIG. 10 is an illustration of a source assembly and a vacuum chamber of a mass spectrometer, in accordance with certain examples.

An illustrative source assembly is illustrated in FIG. 10, where a source assembly 4 being inserted into an instrument 30 is shown. In this configuration, the source assembly is coupled to a vacuum port 1 through a spring loaded center shaft though other devices and methods of coupling a vacuum port to a source assembly may be used. To insert the source assembly 4 into the vacuum chamber 9, the user holds the handle 3 and inserts the source into the large bore of the guide block 2. The bore is sized and arranged to provide a close fit between the handle 3 and the bore but not so close that there is substantial friction between the handle surface and the bore during insertion. The close fit between the vacuum port 1 and handle outside diameter and the guide block 2 inner diameter is operative to position the source assembly 4 radially along the proper centerline in the instrument 30. Further insertion of the source assembly 4 is restricted until guide block pins or bosses 15 and 20 pressed into the guide block 2 are aligned with the slots in the handle 3 and vacuum port 1. Inadvertent assembly in another angular position is prevented due to another set of guide block pins and corresponding slots in the handle 3 and located at any other angle other than 180 degrees relative to each other. Alignment of the slots of the source assembly 4 into the pins of the guide block is facilitated through markings (not shown). The source assembly 4 is further inserted for a predetermined length. These two slots are in alignment to complete the insertion of the source 4 into the vacuum chamber 9. Once the source assembly 4 is completely inserted in the axial direction, the seal 7 of the source assembly 4 is in contact with the sealing face of the vacuum chamber 9. The user then rotates the handle 3 which acts to compress a spring 8 applying an axial force on the vacuum port 1 against the vacuum chamber sealing face. The vacuum port 1 is prevented from rotating by guide block pin 15. The spring is pre-compressed by a shoulder screw 6, and it has detents that lock into the open and closed position through two grooves in the handle 3 and a spring loaded plunger. The handle 3 is rotated until it locks into or clicks into the detent and compresses the spring. To remove the device, the user rotates the handle 3 in the opposite direction which retracts the spring compression force of the vacuum port 1 against the sealing face of the vacuum chamber 9. The vacuum port 1 is prevented from rotating by guide block pin 15. The guide block pins 15 and 20 prevent removal of the source assembly 4 until both the handle cam profile and the slot in the vacuum port 1 are aligned.

Figure 11:
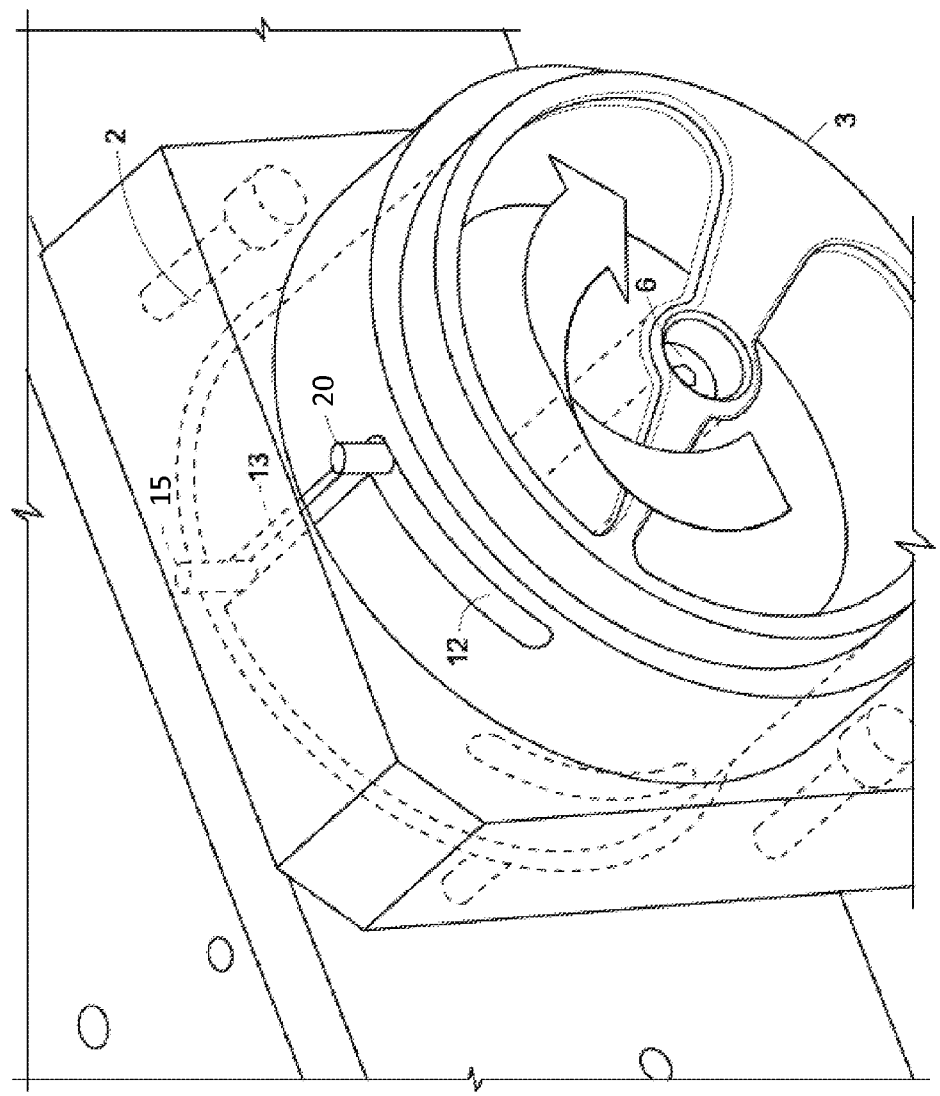
FIG. 11 is an illustration showing the guide pins of the mass spectrometer housing and the slot in the handle of the source assembly, in accordance with certain examples.

In certain embodiments, a closer view of the guide pins and slots is shown in FIG. 11. The handle 3 includes a slot 12 and a slot 13. The slots 12 and 13 are generally perpendicular to each other. The source assembly is inserted into the guide block 2 of the instrument using guide pins 15 and 20. The pins 15 and 20 slidingly engage to the slots 12 and 13. Upon insertion of the pin 15 at the outer portion of the slot 13, the handle 3 is rotated, which moves the pin 15 along the slot 12 in a circumferential direction and couples the source assembly to the instrument to provide a substantially fluid tight seal between the source assembly and a vacuum chamber of the instrument.

Example 2

The stationary component and moveable component may include one or more components that couple them to each other at least for some period. For example, it may be desirable to keep the moveable component and the stationary component aligned when the source assembly is removed from the instrument for cleaning.

Figure 12:
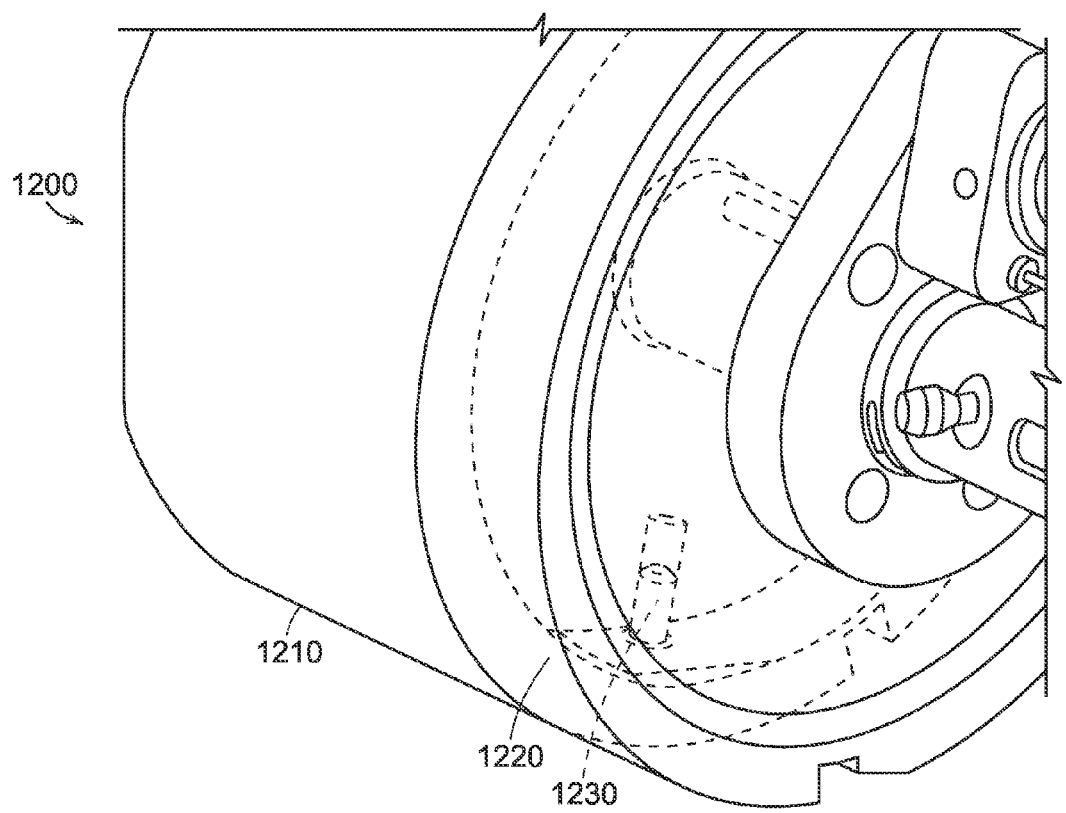
FIG. 12 is an illustration of a moveable component and a stationary component and a plunger that can couple to the two components, in accordance with certain examples.

One configuration that retains alignment while permitting removal is shown in FIG. 12. The source assembly includes a moveable component 1210 and a stationary component 1220. Between the moveable component 1210 and the stationary component 1220 is a plunger 1230 that is effective to align the moveable component 1210 and the stationary component 1220. In operation, the plunger 1230 provides a resistive force between the moveable component 1210 and the stationary component 1220, which assists in keeping the slots aligned when the source assembly 1200 is outside of the device, e.g., when it is removed for cleaning or prior to insertion into the instrument housing.

Figure 13:
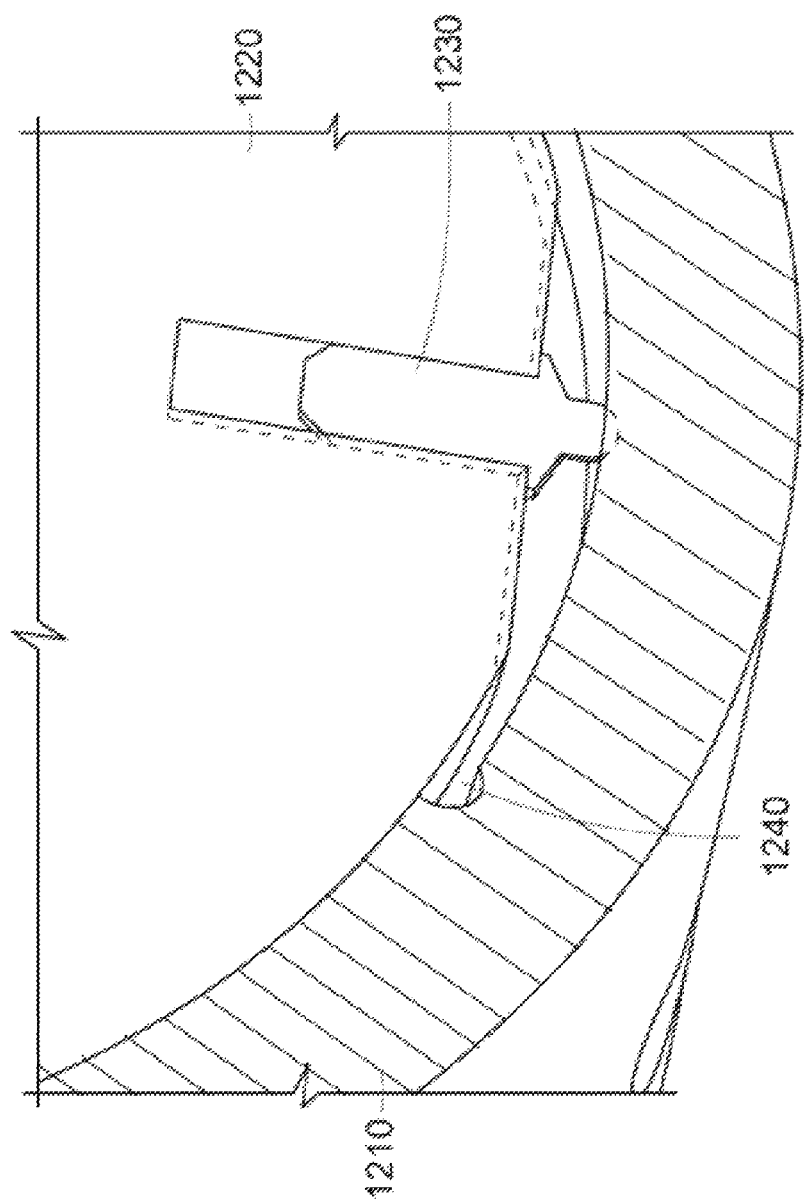
FIG. 13 is a cross-section through the moveable component and the stationary component of FIG. 12 showing a detent on the moveable component that can receive the plunger of the stationary component, in accordance with certain examples.

FIG. 13 shows a cross-section through the moveable component 1210 and the stationary component 1220. The moveable component 1220 can include a detent 1240 configured to receive the plunger 1230. When the plunger 1230 is in the detent 1240, the slots of the moveable component 1210 and the stationary component 1220 are aligned. Coupling of the plunger 1230 to the detent 1240 acts to deter motion of the moveable component 1210 with respect to the secondary component 1230 to ensure the slots of the moveable and stationary component remain aligned when the source assembly 1200 is not coupled to another device such as an instrument housing, for example.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A source assembly comprising a source configured to couple to a vacuum port of a vacuum chamber of an instrument comprising a first pin and a second pin each extending radially from the instrument, the source assembly comprising:
   a moveable component comprising a circumferential slot;
   a stationary component comprising the source, in which the source comprises a plurality of lenses;
   in which the stationary component further comprises a slot that is configured to receive the first in and the second in of the instrument into the slot of the stationary component to align the source in the instrument when the first and second pins engage the slot of the stationary component;
   in which the moveable component is configured to provide an axial force to the stationary component upon rotational movement of the moveable component in a first direction by compression of a spring, in which the moveable component is further configured to release the provided axial force upon rotational movement of the moveable component in a second direction opposite the first direction; and
   in which rotational movement of the moveable component in the first direction is configured to engage the second pin in the circumferential slot of the moveable component to lock the stationary component in place and compress the spring to thereby provide a substantially fluid tight seal between the source and the vacuum chamber.

2. The source assembly of claim 1, in which the spring is present in a spring loaded center shaft.

3. The source assembly of claim 1, in which the slot of the stationary component is configured to position the source radially along a centerline of the instrument.

4. The source assembly of claim 1, in which the slot of the stationary component and the circumferential slot of the moveable component are aligned prior to rotation of the moveable component.

5. The source assembly of claim 4, in which the stationary component is configured to insert into the instrument until the second pin of the instrument contacts the circumferential slot of the moveable component.

6. The source assembly of claim 1, in which the stationary component further comprises a seal configured to contact a sealing face of the vacuum chamber when the stationary component is locked in place.

7. The source assembly of claim 1, in which the vacuum port of the instrument is configured to not rotate when the moveable component is moved from the first position to the second position.

8. The source assembly of claim 1, in which the spring comprises detents.

9. The source assembly of claim 1, in which the spring comprises a spring loaded plunger.

10. The source assembly of claim 1, in which the moveable component comprises a cam.

11. The source assembly of claim 1, in which the source is an ion source or an electron source.

12. The source assembly of claim 1, further comprising a plunger configured to align the stationary component and the moveable component when the source assembly is removed from the instrument.

13. The source assembly of claim 12, in which the plunger is configured to provide a resistive force between the moveable component and the stationary component.

14. The source assembly of claim 13, in which the moveable component comprises a detent configured to receive the plunger.

15. The source assembly of claim 13, in which the moveable component is configured to position the circumferential slot of the moveable component perpendicular to the slot of the stationary component prior to rotational movement of the moveable component in the first direction.

16. The source assembly of claim 1, in which the moveable component is configured to position the circumferential slot of the moveable component perpendicular to the slot of the stationary component prior to rotational movement of the moveable component in the first direction.

17. A source assembly comprising a source configured to couple to a vacuum port of a vacuum chamber of an instrument comprising a first pin and a second pin each extending radially from the instrument the source assembly comprising:
 a moveable component comprising a circumferential slot;
 a stationary component comprising the source, in which the source comprises a plurality of lenses;
 a plunger between the moveable component and the stationary component and configured to provide a resistive force between the moveable component and the stationary component;
 in which the stationary component further comprises a slot that is configured to receive the first pin and the second pin of the instrument into the slot of the stationary component to align the source in the instrument when the first and second pins engage the slot of the stationary component, in which the plunger is configured to align the slot of the stationary component with the circumferential slot of the moveable component when the source assembly is removed from the instrument;
 in which the moveable component is configured to provide an axial force to the stationary component upon rotational movement of the moveable component in a first direction by compression of a spring, in which the moveable component is further configured to release the provided axial force upon rotational movement of the moveable component in a second direction opposite the first direction; and
 in which rotational movement of the moveable component in the first direction is configured to engage the second pin in the circumferential slot of the moveable component to lock the stationary component in place and compress the spring to thereby provide a substantially fluid tight seal between the source and the vacuum chamber.

18. The source assembly of claim 17, in which the spring is present in a spring loaded center shaft.

19. The source assembly of claim 17, in which the stationary component is configured to insert into the instrument until the second pin of the instrument contacts the circumferential slot of the moveable component.

20. The source assembly of claim 17, in which the moveable component comprises a cam.

\* \* \* \* \*